United States Patent [19]

Tamenori et al.

[11] Patent Number: 4,678,652

[45] Date of Patent: Jul. 7, 1987

[54] PROCESS FOR PRODUCING SILICA IN FINE POWDER FORM

[75] Inventors: Hiroyuki Tamenori, Kawanishi; Akihiko Hattori, Itami; Mitsugi Yoshiyagawa, Yokkaichi, all of Japan

[73] Assignee: Nippon Sheet Glass Co., Ltd., Osaka, Japan

[21] Appl. No.: 785,806

[22] Filed: Oct. 9, 1985

[51] Int. Cl.$^4$ ............................................. C01B 33/12
[52] U.S. Cl. ..................................... 423/339; 423/338
[58] Field of Search ................................ 423/338, 339

[56] References Cited

FOREIGN PATENT DOCUMENTS 0044236  1/1982  European Pat. Off. ............ 423/339

*Primary Examiner*—John Doll
*Assistant Examiner*—Lori S. Freeman

[57] ABSTRACT

A process for producing silica in fine powder form, which comprises (a) adding at least one water-miscible alcohol selected from water-miscible monohydric and dihydric alcohols to an aqueous solution of an alkali metal silicate having an $SiO_2$ concentration of 9 to 20% by weight until a solid precipitate forms and the solution begins, or is about, to become turbid, (b) adding a mineral acid to the resulting mixture in an amount 35 to 80% of the stoichiometrical amount required to neutralize the alkali metal silicate to precipitate silica as a fine powder, and (c) thereafter bringing the resulting slurry into contact with a mineral acid under an acidity of at least 1N.

17 Claims, No Drawings

PROCESS FOR PRODUCING SILICA IN FINE POWDER FORM

This invention relates to a process for production of a fine silica powder, and more specifically, to a process for producing a fine silica powder of high purity, which can be used as a raw material for the production of silicon used in solar cells, efficiently by a simple operation.

Silicon for use in solar cells is generally required to have a high purity on the order of five-nine to seven-nine in order to secure good efficiency in the conversion of solar energy to electrical energy. For the production of such highly pure silicon, a method has already been known which comprises reducing silica of high purity to silicon of high purity (for example, U.S. Pat. No. 4,247,528 corresponding to Japanese Laid-Open Patent Publication No. 136116/1980).

In order to produce high purity solar cell-grade silicon by the above reducing method, silica used as a raw material is generally required to have a purity of at least four-nine. In particular, the concentrations of impurities such as boron, phosphorus and transition metals contained in it desirably should not exceed 1 ppm respectively.

Natural resources such as high-quality quartz may be utilized as such a high purity starting silica, but are unsuitable for industrial mass-production since their supply is limited and they are expensive. For this reason, methods for producing highly pure silica from easily available inexpensive silicate salts have been extensively studied. One such prior method comprises adding a flux to a siliceous material (such as silica sand or feldspar), melting the mixture, forming a fibrous mass of silicate glass from the melt, and leaching the fibrous glass with an acid to form powdery porous silica ($SiO_2$) (see U.S. Pat. No. 4,294,811 and DE-OS3123009). In order to obtain highly pure silica by leaching, the glass composition should be limited to one which can be easily leached, and much aluminum oxide or alkaline earth metal salts must be added as glass components in addition to silicon dioxide. This leads to the disadvantage that after the glass is fiberized, these components other than silicon dioxide should all be removed. Furthermore, when the silicate glass fibers contain fibers of large diameters, the resulting silica may contain unleached silicate glass as an impurity.

On the other hand, a method is known to obtain silica gel by reacting an alkali silicate (commonly called water glass or soluble silicate) with an acid [for example, J. G. Vail, "Soluble Silicates" (ACS monograph series), Reinhold, N.Y., 1952, vol. 2, page 549]. Silica gel is composed of $SiO_2$ having a relatively high purity, and it may be possible to use the silica gel as a material for production of silicon in the aforesaid reducing method. However, silica gel usually has an $SiO_2$ purity of about 99.5% by weight, and even its "high-purity" grade has a purity of up to about 99.95%. As such, it cannot be used as a material for producing solar cell-grade silicon requiring a purity of at least four-nine.

It is an object of this invention to provide a simple and efficient process for the production of a fine silica powder of high purity which can be used as a raw material for the production of solar cell-grade silicon.

According to this invention, there is provided a process for producing high purity silica in fine powder form, which comprises (a) adding at least one water-miscible alcohol selected from water-miscible monohydric and dihydric alcohols to an aqueous solution of an alkali metal silicate having an $SiO_2$ concentration of 9 to 20% by weight until a solid precipitate forms and the solution begins, or is about, to become turbid, (b) adding a mineral acid to the resulting mixture in an amount 35 to 80% of the stoichiometrical amount required to neutralize the alkali metal silicate to precipitate silica as a fine powder, and (c) thereafter bringing the resulting slurry into contact with a mineral acid under an acidity of at least 1N (where N denotes normality).

It should be understood that the term "silica", as used in the present specification, denotes not only anhydrous $SiO_2$ but also silica hydrates ($SiO_2 \cdot xH_2O$).

The alkali metal silicate used as a starting material in the process of this invention includes, for example, lithium silicate, sodium silicate and potassium silicate. Sodium silicate is preferred. There is no particular restriction on the $SiO_2/M_2O$ (wherein M represents an alkali metal) in these silicates, and it may be selected within a broad range. Generally, silicates having an $SiO_2/M_2O$ mole ratio of from 2 to 4, preferably from 2.5 to 3.5, are suitable. Particularly, sodium silicate in accordance with JIS No. 3 standard ($SiO_2$: 28-30 wt. %; $Na_2O$: 9-10 wt. %; specific gravity: at least 1.385), which is an aqueous solution of sodium silicate, can be conveniently used because it is easily available commercially at low prices. Furthermore, alkali metal silicates available in the form of an aqueous solution, such as a solution obtained by dissolving a melt-shaped article of an alkali metal silicate in water under high pressures or a solution obtained by dissolving an amorphous silicate (for example, amorphous silica or diatomite formed during the production of silicon) in an alkali hydroxide, can also be used as the starting material in the proces of this invention.

According to the process of this invention, the aqueous solution of an alkali metal silicate is first prepared. The concentration of the alkali metal silicate is such that the concentration of $SiO_2$ in the aqueous solution is 9 to 20% by weight, preferably 11 to 17% by weight, more preferably 12 to 16% by weight. A commercially available aqueous solution of an alkali metal silicate having an $SiO_2$ concentration within the aforesaid range may be used directly or after it is further diluted suitably with water. A commercially available aqueous solution of an alkalii metal silicate having a higher $SiO_2$ concentration above the upper limit of the above range may be used after diluting it with water to the aforesaid $SiO_2$ concentration. For example, by diluting the aforesaid aqueous sodium silicate solution in accordance with JIS No. 3 standard with water to 1.5 to 5 times the original volume, it can be suitably used as the aqueous alkali silicate solution in this invention.

A water-miscible alcohol selected from water-miscible monohydric and dihydric alcohols is added to the aqueous alkali metal silicate solution so prepared. The term "water-miscible alcohol", as used in the present specification, denotes an alcohol having a solubility in distilled water at 25° C., of at least 50 g/liter, preferably at least 100 g/liter.

The water-miscible monohydric alcohols may be alkanols such as methanol, ethanol, n-propanol, isopropanol, n-butanol, sec-butanol and 2-hexanol. Alcohols having 1 to 4 carbon atoms are preferred, and the alkanols having 1 to 3 carbon atoms are especially preferred. The water-miscible dihydric alcohols may be of high or low molecular weight, and includes, for example, alkanediols such as ethylene glycol, propylene glycol, 1,3-butanediol and 1,4-butanediol; and polyalkylene oxides such as polyethylene oxide having a average molecular weight of not more than 1000, preferably 200 to 600, and polypropylene oxide having an average molecular weight of not more than 900, preferably 200 to 400. Alkylenediols having 2 to 4 carbon atoms and polyalkylene oxides having an average molecular weight of 200 to 600 are preferred. Polyethylene oxide having an average molecular weight of 200 to 400 is especially preferred. The above alcohols may be used singly or in combination. Polyethylene oxide having an average molecular weight of 200 to 400 can be used particularly advantageously as the water-miscible alcohol in this invention.

When the water-miscible alcohol is gradually added to the aqueous alkali metal silicate solution and a certain fixed amount of it has been added, a solid precipitate forms and the solution becomes turbid. If the addition is continued, the precipitate gradually increases. One great characteristic feature of the present invention is that the water-miscible alcohol is added to the aqueous alkali metal silicate solution until the solid precipitate forms and the solution begins to become turbid (this point of time is defined in the present specification as the "turbidity point") or is about to become turbid (in other words, until a point of time immediately before the "turbidity point"). This special operation enables the fine silica powder to be precipitated smoothly and efficiently in the subsequent step (b) and the fine silica powder to be leached with a mineral acid smoothly and efficiently in the subsequent step (c), and consequently gives a fine silica powder of high purity having excellent filtrability.

When the water-miscible alcohol is added in an amount much smaller than that corresponding to the "turbidity point", gellation occurs when the mineral acid is added in step (b) and a precipitate of a fine powder is difficult to obtain. Instead, a paste-like precipitate having very poor filtrability tends to be formed. On the other hand, when it is added in an amount much larger than that corresponding to the "turbidity point", it is difficult to obtain high purity silica presumably because the dehydrating action of the alcohol leads to the formation of a large amount of a precipitate of silica insufficiently leached with the mineral acid.

The suitable amount of the water-miscible alcohol to be added is within not more than ±30%, preferably not more than ±20%, more especially preferably not more than ±10%, of the amount corresponding to the "turbidity point".

In the present specification, the "turbidity point" can be determined by the following method on the starting aqueous alkali metal silicate solution to which the process of the invention is applied.

The starting aqeuous alkali metal silicate solution having an $SiO_2$ concentration of 9 to 20% is taken in an amount of about 100 g as $SiO_2$ and put in a 2-liter beaker. While it is stirred by magnetic stirrer (the length of the stirring member: 40 mm) at such a speed of rotation that the whirlpool owing to the stirring just reaches the stirring member, the water-miscible alcohol is added at a speed of about 10ml/min. Slight turbidity may occur in the solution during the addition, but the addition of water-miscible alcohol is continued and stopped when by visual observation, the turbidity of the solution reached the turbidity of a standard formazine suspension having a turbidity, stipulated in DIN 38404, C2-5, of TE/F=100. The amount of the water-miscible alcohol which has been added until this point is defined as the "turbidity point". After the "turbidity point", variations in turbidity occur abruptly, and the state of turbidity can be sufficiently judged even without a measuring instrument.

Desirably, the addition of the water-miscible alcohol to the aqueous alkali metal silicate solution is carried out at a temperature of generally 15° to 50° C., preferably 20° to 40° C. with uniform stirring so as to minimize local precipitation. For uniform stirring, the water-miscible alcohol may be diluted with water prior to addition. The water-miscible alcohol may be added continuously or intermittently. The speed of addition is not critical, and can be varied depending upon the type or concentration of the alkali metal silicate, the type of the alcohol, the degree of stirring, etc. It is desirable to avoid local precipitation. Alternatively, the water-miscible alcohol may be mixed with the alkali metal silicate solution by u ing a motionless mixer or the like.

In the next step, a mineral acid is added to the aqueous alkali metal silicate solution with which the water-miscible alcohol is mixed, thereby precipitating silica as a fine powder. Examples of the mineral acid that can be used for this precipitating step are hydrochloric acid, sulfuric acid, nitric acid, phosphoric acid and a mixture of two or more of these acids. Of these, sulfuric acid and nitric acid are preferred, the former being especially preferred. These acids may be used in a concentration of usually 2 to 18N, preferably 3 to 12N.

The amount of the mineral acid can be varied within the range of 35 to 80%, preferably 50 to 70%, of the stoichiometrical amount required to neutralize the alkali metal silicate depending upon the type of the mineral acid used, the types and concentrations of the alkali metal silicate and the water-miscible alcohol used. When the amount of the mineral acid is smaller than 35% of the stoichemical amount, the amount of silica precipiates is small, and the yield of the desired fine silica powder is reduced. Silica remaining unprecipitated is colloidal or sol-like silica, and cannot be collected by filtration. This is considered to be the reason for the reduced yield of the fine silica powder. On the other hand, when the amount of the mineral acid added exceeds 80% of the stoichiometrical amount, the pH of the reacted solution approaches neutrality, and the rate of gellation becomes fast. Consequently, gel-like silica forms in addition to the powdery silica precipitated. This reduces the filtrability of the product and therefore, raises the difficulty of obtaining high-purity silica.

Desirably, the addition of the mineral acid is carried out gradually with stirring over some period of time while gel formation is inhibited as much as possible (with a care taken not to permit a substantial rise in the viscosity of the mixture) and controlling the system such that silica will be precipitated as a fine solid powder. Particularly, the addition of the mineral acid in an amount reaching 35% of the stoichiometrical amount required to neutralize the alkali metal silicate is desirably effected slowly over a significant period of time. The speed of addition at this time may vary depending upon the concentration of the alkali metal silicate in the aqueous solution or the concentration of the mineral acid to be added, but conveniently, this period of time is generally at least 5 minutes, preferably at least 10 minutes. More specifically, it is especially preferred that when the SiO₂ concentration of the aqueous alkali metal silicate solution used as the starting material is 12 to 16% by weight, the addition be effected over at least 10 minutes, usually over 15 to 60 minutes. Desirably, the period of addition should be increased as the SiO₂ concentration of the starting aqeuous alkali metal silicate solution increases.

Desirably, the addition of the mineral acid is carried out with vigorous stirring so as to minimize local gel formation, as stated above. In particular, the addition is effected continuously or intermittently so that the pH of the mixture will not fall below 10, preferably below 10.5 while monitoring it, as required, by a pH meter. The mixture during this addition is maintained at a relatively low temperature within the range of 15° to 50° C., more preferably 20° to 40° C.

By adding the mineral acid to the mixture of the aqueous alkali metal silicate solution and the water-miscible alcohol, silica is precipitated gradually as a fine powder as the addition of the mineral acid proceeds, and a slurry is formed. After the addition of the mineral acid, the slurry may be immediately subjected to the next step. If desired, it may be aged for a certain period of time, for example 5 to 30 minutes. The aging may be effected by maintaining the resulting slurry at room temperature with stirring.

The resulting slurry is then contacted with a mineral acid to leach out impurities from the precipitated silica powder in the slurry. The mineral acid used in the leaching may be the same mineral acids as used in precipitating the fine silica powder. However, it does not always have to be the same kind of acid as used in precipitating the fine silica powder. Usually, it is desirably the same kind of acid. Sulfuric acid and nitric acid, especially the former, are preferred.

Contacting of the slurry with the mineral acid may be effected by adding the mineral acid to the slurry, or by adding the slurry to the mineral acid and mixing the sufficiently with stirring. The speed of addition of the mineral acid or slurry at this time is not critical. It is only required that the silica powder in the slurry should come into intimate and sufficient contact with the mineral acid.

The amount of the mineral acid is such that the acidity of the slurry after mixture is at least 1N, preferably 1.5 to 4N, more preferably 2 to 3N. If the acidity of the slurry is lower than 1N, the silica is leached only insufficiently and high purity silica is difficult to obtain. On the other hand, it is economically undesirable to maintain the acidity too high.

The contacting of the fine silica powder in the slurry with the mineral acid is carried out generally at a relatively high temperature of 70° C. or higher to promote the leaching. Temperatures in the range of 90° to 100° C. are preferred. The contacting time is usually at least 10 minutes, preferably 30 minutes to 3 hours.

The slurry from which the impurities have been extracted by leaching is then filtered to recover the fine silica powder. As required, the filtration cake is washed with a mineral acid and/or water. Preferred mineral acids used for this purpose are hydrochloric acid and nitric acid in a concentration of generally 1 to 12N, preferably 2 to 8N. This washing with the acid can lead to further removal of highly hydrolyzable impurities such as aluminum, titanium and zirconium that may be present in the filtration cake, and silica of higher purity can be obtained.

The above washing can be carried out one or a plurality of times usually at a temperature of 60° to 100° C. for the mineral acid and 15° to 50° C. for water.

Finally, the resulting fine powder of silca gel is dried at a temperature of, for example, about 100° to 150° C., and highly pure fine silica powder having a particle diameter of generally 5 to 500 microns can be obtained.

According to the proces of this invention described above, silica is precipitated in the silica precipitating step in a form that can be easily leached in the subsequent acid leaching step. Accordingly, the fine silica powder obtained by this invention has an extremely high purity of at least four-nine as will be clearly shown in Examples given hereinafter, and can be fully used as a material for the production of solar cell-grade silicon. Another notable advantage is that the slurry of the fine silica powder obtained by the process of this invention has very high filtrability, and the process of this invention has very good operability.

The following examples illustrate the present invention more specifically.

EXAMPLE 1

A starting solution containing 13.6% by weight of SiO₂ was prepared by mixing 375 g of water glass (SiO₂: about 30% by weight) having an SiO₂/Na₂O mole ratio of 3.2 with 450 ml of water. While the starting solution is stirred, polyethylene oxide having an average molecular weight of 200 was added at a speed of about 10 ml/min. When 73 ml of polyethylene oxide was added, the solution began to become turbid. Hence, the addition of polyethylene oxide was stopped. While the solution was stirred, 80 ml of 25% by weight sulfuric acid was slowly added at a rate of about 10 ml/min. After the addition of sulfuric acid, the mixture was stirred further for 5 minutes to avoid non-uniformity in pH. The addition of sulfuric acid formed a precipitate in the solution, and the amount of the precipitate increased with the addition of sulfuric acid. But no outstanding change in the viscosity of the solution was seen. The resulting precipitate had a particle diameter of less than about 1000 micrometers.

The operations up to this time were all carried out at room temperature, and no heating was done.

The amount (80 ml) of the 25% sulfuric aci corresponded to 50% of the amount required to neutralize 375 g of water glass, and the pH of the mixture was about 11.

Then, 750 ml of sulfuric acid (25% by weight) was added to the reacted solution containing the precipitate formed as a result of the foregoing operations in order to wash out impurities. The mixture was heated to 90° C. and maintained at this temperature for 2 hours. The acid concentration of the mixed solution at this time was about 2.4N. Since most of the precipitate in the mixed solution sedimented. the solution was stirred for about 5 seconds before the heating and every about 30 minutes during the heating. Thereafter, the solution was suction-filtered to separate the precipitate. The precipitate was found to be silica containing about 200 parts of water (water content about 200%) per 100 parts by weight of SiO₂.

To the resulting silica was added 750 ml of 20% by weight hydrochloric acid, and the mixture was heated to 90° C. and maintained at this temperature for 1 hour. The solution was then suction-filtered to separate silica again. Then, the same washing with hydrochloric acid was repeated twice. Purified water was added, and the mixture was repeatedly washed and filtered so that the pH of the filtrate became at least 4.

The resulting silica was dried at 150° C. for 10 hours and weighed. About 100 g of silica was obtained. The concentrations of impurities in the resulting silica were measured by plasma emission analysis and mass analysis, and the results are shown in Table 1.

The amounts of impurities in a commercial chromatographic silica gel (C-100, produced by Wako Pure Chemicals, Co., Ltd.) which is generally said to be highly pure and industrial silica gel were measured, and the results are shown in Table 1 as Comparative Examples 1 and 2).

Table 1 demonstrates that the silica produced by the process of this invention has a much higher purity than conventional commercial silica.

EXAMPLE 2

Example 1 was repeated except that the amount of polyethylene oxide (average molecular weight 200) was changed to 75 ml (1.03 times the turbidity point since the turbidity point is 73 ml) and the amount of 25% sulfuric acid was changed to 112 ml. As a result, about 105 g of silica was obtained. [The amount of sulfuric acid (112 ml) was 70% of the amount required for neutralization.] The amounts of impurities in the resulting silica are shown in Table 1.

The product was of high purity as in Example 1.

EXAMPLE 3

A silica precipitate was produced by operating in the same way as in Example 1 except that instead of polyethylene oxide, methanol was added in an amount of 90 ml corresponding to the "turbidity". The precipitate was leached with the same sulfuric acid as in Example 1, followed by filtration to give silica having a water content of 245%. To the resulting silica was added 750 ml of hydrochloric acid and the mixture was maintained at 90° C. for 1 hour. This washing was effected twice. Furthermore, the washed product was washed with purified water in the same way as in Example 1 until the pH of the washing became 4. The resulting silica was dried at 150° C. for 10 hours. The weight of silica was 101 g. The amouns of impurities are shown in Table 1.

Silica which can be used as a raw material for the production of solar cell-grade silicon is required to have high purity and be low in the cost of production. In other words, high productivity is required in the production of such silica. To produce finely divided silica having a high purity, the separation of silica from the washing should be repeatedly carried out for accurate removal of impurities. Usually, the filtraion operation should be carried out several times. Needless to say, the productivity is better as the filtration time is shorter. The present invention is characterized in that the resulting fine powder of silica is of high purity and a precipitate having good filtrability and high productivity can be obtained.

In the following Examples, the filtrability of silica produced by the process of this invention was examined.

EXAMPLES 4-15

A starting solution having an SiO₂ concentration of 13.6% by weight was prepared by mixing 375 g of water glass (SiO₂: about 30% by weight) having an SiO₂/Na₂O mole ratio of 3.2. To the starting solution was added each of the water-miscible alcohols shown in Table 2 in an amount corresponding to 0.9 to 1.3 times the "turbidity points". Then, 80 ml of 25% by weight sulfuric acid was added over the course of about 15 minutes to precipitate silica. Subsequently, 210 ml of 25% by weight sulfuric acid was added to adjust the pH of the mixture to 1. The mixture was maintained at 90° C. for 1 hour and suction filtered. The filtration was carried out by using a Buchner funnel having an inside diameter of 11 cm and a filter paper having the same diameter for chemical analysis. The mixture was suction-filtered by means of a water stream aspirator, and the time which elapsed until the filtrate removed was measured. Table 2 shows the amounts of the water-miscible alcohols and the times required for filtration. Short filtration times are advantgeous for industrial production. It is seen from Table 2 that where the water-miscible alcohol was added in an amount within ±30% of the "turbidity point", the filtration time was short.

COMPARATIVE EXAMPLE 3

Silica was prepared in the same way as in Example 1 except that the amount of polyethylene having an average molecular weight of 200 was changed to 38 ml which is about 50% of the "turbidity point".

When 80 ml of 25% by weight sulfuric acid was added, the silica precipitate was not powdery but paste-like. More specifically, it was a mixture of a powdery precipitate and a paste-like gel.

Subsequently, 750 ml of 25% by weight sulfuric acid was added, and the mixture was heat-treated at 90° C. for 2 hours and subjected to suction filtration in the same way as in Example 1. However, since the solution contained the paste-like precipitation, it could not be suction-filtered.

When the amount of sulfuric acid added in the first step was changed to 56 ml and 94 ml, a paste-like precipitate formed and the filtration was impossible in either case.

COMPARATIVE EXAMPLE 4

Example 1 was repeated except that polyethylene oxide having an average molecular weight of 200 was added in an amount of 112 ml which corresponds to about 150% of the "turbidity". The amounts of impurities in the resulting silica are shown in Table 1.

Since the amount of polyethylene oxide in this comparative example was too large, the purity of the silica was reduced.

COMPARATIVE EXAMPLES 5-11

The procedure of Example 4 was repeated except that the water-miscible alcohols shown in Table 2 were added in the amounts indicated in Table 2 which correspond to not more than ±30% of the "turbidity points". After treatment at 90° C. for 1 hour, the silica-containing solution was filtered and the filtration time was measured. Table 2 summarizes the types, turbidity points and amounts added of the water-miscible alcohols and the filtration times.

It is seen from the results that a precipitate having good filtrability cannot be obtained if the amounts of the water-miscible alcohols are outside the range of not more than ±30% of the turbidity points. Glycerol and sorbitol did not cause turbidity and were not effective even when added in amounts of more than 300 ml.

COMPARATIVE EXAMPLE 12

190 g of the same water glass as in Example 1 was diluted with 800 ml of hot water, and the temperature of the diluted solution was adjusted to 54° C. (130° F. ). The solution was poured with strong stirring into a mixture of 800 ml of methanol and 100 ml of water. Fine particles of the silicate formed, and the solution became very turbid. Carbon dioxide gas was bubbled through the suspension from its bottom at a rate of about 2 liters/min. The pH of the solution reached about 9 in 40 minutes, about 8 in 50 minutes and about 7 in 60 minutes. In the Example of U.S. Pat. No. 2,386,337, the experiment was stopped at this point and silica was obtained. In the present comparative example, to increase the purity of silica, 336 ml of 25% sulfuric acid was added to this solution and the washing operation was further carried out by maintaining the mixture at 90° C. for 2 hours. The solution was filtered, and the filtrate was washed two times with 380 ml of 20% hydrochloric acid at 90° C. for 1 hour. The amounts of sulfuric acid and hydrochloric acid added were determined so that the acidity of the slurry agreed with that shown in Example 3. The resulting silca was washed with purified water until the pH of the washing became 4, and then dried at 150° C. for 10 hours. The amounts of impurities were measured, and the results are sown in Table 1.

In the present comparative example, silica having a high purity could not be obtained because methanol was used in an amount of as high as about 15 times the turbidity point.

COMPARATIVE EXAMPLE 13

Example 1 was repeated except that 3 g of sodium laurylbenzenesulfonate as a surfactant dissolved in water was added instead of the polyethylene oxide. The resulting silaca was analyzed, and the results are shown in Table 1.

It is seen that even when the surface-active agent is added, high-purity silica cannot be obtained.

TABLE 1

| Impurities | Al | Fe | Ca | Ti | Zr | B | P |
|---|---|---|---|---|---|---|---|
| Example 1 | 2.9 | <0.2 | 0.3 | 1.6 | 0.8 | <1 | <1 |
| Example 2 | 5.6 | 0.4 | 0.3 | 3.7 | 2.3 | <1 | <1 |
| Example 3 | 3.0 | 0.5 | <0.1 | 4.0 | 1.1 | | |
| Comparative Example 1 | 10 | 12 | 177 | 145 | 18 | | |
| Comparative Example 2 | 53 | 84 | 92 | 147 | 14 | | |
| Comparative Example 4 | 47 | 3.4 | 0.2 | 7.3 | 5.3 | | |
| Comparative Example 12 | 22 | 0.5 | 0.4 | 15 | 6.0 | | |
| Comparative Example 13 | 53 | 0.7 | 0.6 | 9.8 | 2.9 | | |

B and P were measured by the mass analysis method, and the other elements were measured by the plasma emussion analysis method (ICP-AES).

TABLE 2

| | Water-miscible alcohol | "Turbidity point" (ml) | Amount added (ml) | Added amount/ turbidity point ratio | Filtration time (minutes) |
|---|---|---|---|---|---|
| Example | | | | | |
| 4 | Methanol | 90 | 90 | 1.00 | 3.0 |
| 5 | Ethanol | 60 | 75 | 1.25 | 1.0 |
| 6 | n-Propanol | 60 | 60 | 1.00 | 1.3 |
| 7 | n-Butanol | 60 | 75 | 1.25 | 4.0 |
| 8 | sec-Butanol | 55 | 70 | 1.27 | 1.3 |
| 9 | Propylene glycol | 120 | 150 | 1.25 | 2.0 |
| 10 | 1,3-Butanediol | 75 | 75 | 1.00 | 1.3 |
| 11 | 1,4-Butanediol | 75 | 75 | 1.00 | 2.0 |
| 12 | Polyethylene glycol (200) | 73 | 65 | 0.89 | 2.5 |
| 13 | Polyethylene glycol (200) | 73 | 56 | 0.77 | 3.0 |
| 14 | Polyethylene glycol (300) | 65 | 65 | 1.00 | 1.2 |
| 15 | Polyethylene glycol (300) | 65 | 56 | 0.86 | 1.5 |
| Comparative Example | | | | | |
| 5 | n-Butanol | 60 | 225 | 3.75 | 18.3 |
| 6 | n-Octanol | 35 | 75 | 2.14 | >30 |
| 7 | Propylene glycol | 120 | 75 | 0.62 | 4.5 |
| 8 | Polyethylene glycol 200 | 73 | 37 | 0.51 | 5.5 |
| 9 | Glycerol | >300 | 75 | — | >30 |
| 10 | Sorbitol | >300 | 75 | — | >30 |
| 11 | Sorbitol | >300 | 225 | — | >30 |

What is claimed is:

1. A process for producing silica in powder form, which comprises
   (a) adding at least one water-miscible alcohol selected from water-miscible monohydric and dihydric alcohols to an aqueous solution of an alkali metal silicate having an $SiO_2$ concentration of 9 to 20% by weight until a solid precipitate forms and the solution begins, or is about, to become turbid,
   (b) adding a mineral acid to the resulting mixture in an amount 35 to 80% of the stoichiometrical amount required to neutralize the alkali metal silicate to precipitate silica as a fine powder, and
   (c) thereafter bringing the resulting slurry into contact with a mineral acid under an acidity of at least 1N.

2. The process of claim 1 wherein the alkali metal silicate is sodium silicate.

3. The process of claim 1 wherein the $SiO_2$ concentration of the aqueous alkali metal silicate solution is 11 to 17% by weight.

4. The process of claim 1 wherein the water-miscible alcohol is added in an amount within the range of not more than ±30% of its turbidity point.

5. The process of claim 1 wherein the water-miscible monohydric alcohol is an alkanol having 1 to 4 carbon atoms.

6. The process of claim 1 wherein the water-miscible dihydric alcohol is selected from alkylene diols having 2 to 4 carbon atoms and polyalkylene oxides having an average molecular weight of 200 to 600.

7. The process of claim 1 wherein the water-miscible alcohol is polyethylene oxide having an average molecular weight of 200 to 400.

8. The process of claim 1 wherein the mineral acid is sulfuric acid or nitric acid.

9. The process of claim 1 wherein in step (b) the mineral acid is added in an amount corresponding to 50 to 70% of the stoichiometrical amount required to neutralize the alkali metal silicate.

10. The process of claim 1 wherein the addition of the mineral acid in step (b) is carried out slowly while inhibiting the formation of a gel.

11. The process of claim 10 wherein in step (b), the addition of the mineral acid in an amount reaching 35% of the stoichiometrical amount required to neutralize the alkali metal silicate is effected over the course of at least 5 minutes.

12. The process of claim 10 wherein in step (b), the addition of the mineral acid is effected while stirring the mixture so that the pH of the resulting slurry is not lower than 10.

13. The process of claim 1 wherein the step (b) is carried out at a temperature in the range of 15° to 50° C.

14. The process of claim 1 wherein the acidity in step (c) is in the range of 1.5 to 4N.

15. The process of claim 1 wherein the step (c) is carried out at a temperatrue of at least 70° C.

16. The process of claim 1 wherein following step (c), the resulting slurry is filtered, and the filtration cake is washed with a mineral acid and/or water.

17. The process of claim 16 wherein the mineral acid is hydrochloric acid or nitric acid.

* * * * *